Nov. 13, 1951     L. T. SACHTLEBEN     2,574,712
OPTICAL ADJUSTING MICROSCOPE
Filed Oct. 31, 1947
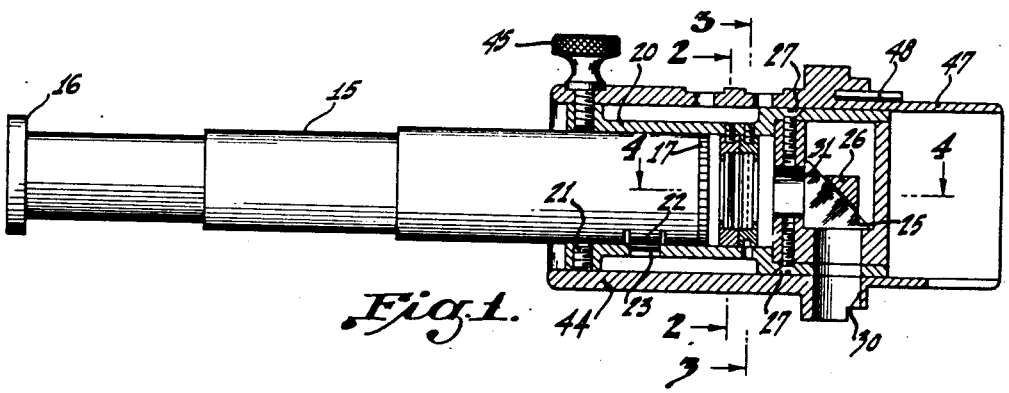
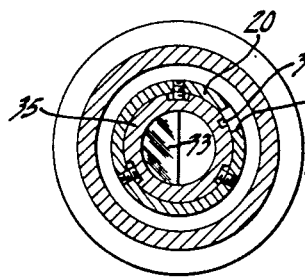
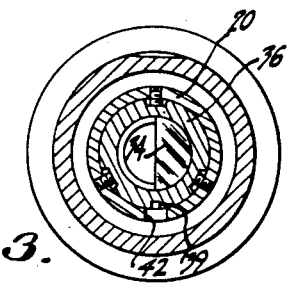
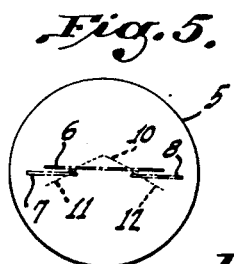
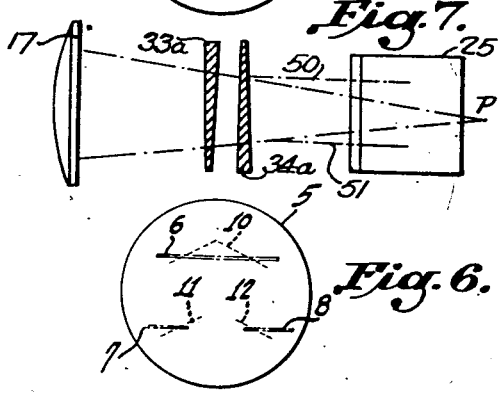
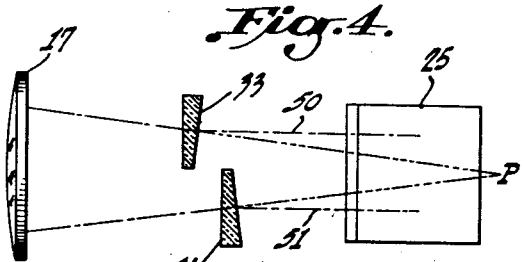
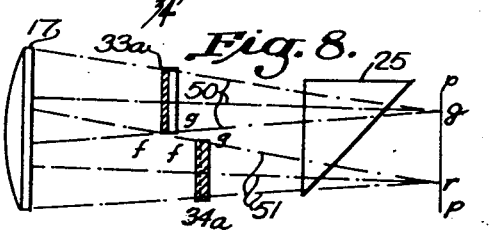
INVENTOR.
LAWRENCE T. SACHTLEBEN
BY
ATTORNEY Patented Nov. 13, 1951

2,574,712

UNITED STATES PATENT OFFICE 2,574,712

OPTICAL ADJUSTING MICROSCOPE

Lawrence T. Sachtleben, Haddonfield, N. J., assignor to Radio Corporation of America, a corporation of Delaware Application October 31, 1947, Serial No. 783,314

9 Claims. (Cl. 88—39)

This invention relates to optical systems, and particularly to a viewing or focusing microscope for use in the adjusting of various elements of a sound recording system.

The use of a microscope for adjusting the position of a beam of light with respect to a slit or aperture and the sound track area of a film is known, the present invention, however, being directed to a microscope of this general type, but suitable for adjusting a light beam with respect to one slit and the cutting edges of a shutter with respect to additional slits, the slits being spaced from one another. In the type of sound recording system known as a direct positive system, and disclosed in my copending application, Ser. No. 783,313, filed October 31, 1947, now Patent No. 2,493,089, dated January 3, 1950, the slit mask is provided with a modulating slit and two noise reduction slits spaced therefrom in a direction normal to the longitudinal axis of the modulating slit. To obtain the necessary bias or stand-by lines which require the elimination of the light from the film over a narrow area or areas by the slight spacing or separation of the intersections of the noise reduction shutter cutting edges with the noise reduction slits from the corresponding intersections of the modulating edges of the beam with the modulating slit, it is necessary that the three slits be viewed as closely together as possible during the adjusting operation. This observation is also necessary to adjust these cutting edges at 100% modulation, under which condition, the intersections of the cutting edges with the noise reduction slits must be in precise alignment with the corresponding ends of the modulating slit to insure effective room on the latter for accommodation of 100% modulation, while, at the same time, guarding against the appearance of unexposed strips on the film at the ends of the modulating slit image.

Since the slits are separated for the purpose of obtaining anticipatory noise reduction by projecting the noise reduction light beam or beams to the film at a point or points longitudinally spaced from the modulating light beam, the modulation and noise reduction slits necessarily must be also spaced apart. However, it is difficult and almost impossible to obtain the proper degree of accuracy of adjustment if the images of these slits are viewed in their normally spaced position. The present microscope, therefore, makes these slit images appear in a substantially coincident position, so that the adjustments may be made with extreme accuracy.

Another feature of the invention is in the construction of the microscope whereby the linear positioning of the images of the slits as seen in the microscope may be controlled along their longitudinal axes, thereby insuring the proper positioning of the images before adjustments of the recording optical elements are made.

The principal object of the invention, therefore, is to facilitate the adjustment of a sound recording system, and particularly the elements of a direct positive sound recording system.

Another object of the invention is to provide an improved microscope for adjusting the elements of a sound recording system in which spaced slit apertures are employed.

A further object of the invention is to provide an improved microscope having adjustable elements for aligning the images of a pair of light passing apertures in their proper linear relationship and to displace the positions of the images within the field of view so that they are substantially coincident.

From the foregoing it will be seen that my microscope constitutes an adjustable alignment standard by which the correct adjustment of a completely external and independent system may be judged and accomplished. In other words, the object to be viewed and adjusted is not functionally associated with the microscope.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Fig. 1 is a partial cross-sectional view of a microscope embodying the invention.

Figs. 2 and 3 are cross-sectional views taken along the lines 2—2 and 3—3, respectively, of Fig. 1.

Fig. 4 is a diagrammatic view of one form of prisms employed in my microscope showing two of the prisms covering the top and bottom halves, respectively, of the objective lens and also showing the optical action of such prisms.

Fig. 5 is a view showing the images as obtained with the microscope of the invention.

Fig. 6 is a view showing the images obtained with prior types of microscopes.

Fig. 7 is a view showing a modification of the arrangement shown by Fig. 4, in which the prisms are elongated in the plane of the sketch and cut in half also parallel thereto in order to cover the halves of the objective lens that are toward and away from the observer, respectively.

Fig. 8 is a view showing the modification illustrated by Fig. 7 but with the lenses and prisms turned at right angles to the similar parts shown by that figure.

Referring now to the drawings, in which the same numerals identify like elements, and particularly referring to Fig. 6, a slit plate 5 may be that of a direct positive sound recording system, the image of the modulating slit being shown at 6, and the images of two noise reduction slits being shown at 7 and 8. These are shown spatially as they would appear in the prior type of microscope, the dotted lines 10 illustrating the modulating edges of the light beam impressed on the plate 5, and the dotted lines 11 and 12 illustrating the cutting edges of the noise reduction shutter which intercept the light passing the slits 7 and 8, the position of the dotted lines 10, 11, and 12 corresponding to the no-signal or stand-by condition of the recorder.

In order to produce the narrow bias lines as illustrated in my above-mentioned copending application, the intersection points of the cutting edges 11 and 12 with the slits 7 and 8 must be slightly spaced or separated from the corresponding intersection points of the cutting edges 10 with the slit 6 so as to prevent light from reaching the film over these narrow areas. Thus, it is particularly desirable that the mirror of the galvanometer of the recording system be adjusted to correctly position the edges 10 on the slit 6, while, at the same time, the noise reduction shutter is adjusted to correctly position the edges 11 and 12 on the slits 7 and 8. By observation, it is noted that it is difficult, when the slits appear widely separated, as shown in Fig. 6, to actually align points of intersection of edges 10 on slit 6 with respect to corresponding points of intersection of edges 11 and 12 on slits 7 and 8. However, the present invention produces a view, as shown in Fig. 5, where this alignment may be very easily made.

Referring now to Fig. 1, a tapered or stepped telescoping barrel 15 contains a lens eye-piece at 16 and a microscope objective lens at 17. The large diameter portion of the barrel 15 is mounted within a cylindrical collar or sleeve 20, and held in position therein by a set screw 21, a section 22 of the large diameter portion of the barrel being partly cut away and bent outwardly to fit in a slot 23 to determine the longitudinal positioning of the barrel 15 in the sleeve 20. Also mounted within the collar or sleeve 20, is an internal reflecting prism 25 mounted on a support 26, and held in position by screws 27. Thus, light entering the microscope through an aperture 30 and impinging on the inclined surface of the prism 25 is reflected at right angles through aperture 31 and through the lens 17 to the eye-piece 16.

Positioned between the aperture 31 and the lens 17 are two 6-diopter prisms 33 and 34 of Figs. 2 and 3, (Bausch and Lomb catalog No. PR-5-060), each prism being mounted within a ring 35 and 36, respectively, adjustable within the sleeve 20 by a pin inserted in holes 38 and 39 through openings 41 and 42 in the sleeve 20. The prisms 33 and 34 are mounted with their thin edges in substantial coincidence and substantially on the microscopic objective axis in a direction effectively parallel to the images of slits 6, 7, and 8. They are, of course, not in the same plane, so that rotational adjustment may be made (see Fig. 4).

The relation between the prisms 33 and 34 and the slits 6 and 7 or 8 is such that the angle through which either prism deviates a ray of light coming from one of the slits must be such that the tangent of such angle is substantially equal to half the distance between the images of slits 6 and 7 or 8 divided by the effective distance from the plane of such images to the prisms. Such effective distance is the sum of the part of the geometric distance that lies in air plus the part that lies in glass divided by the index of refraction by the glass, i. e., prism 25.

The sleeve 20 is mounted within a housing 44 and attached therein by a thumb nut 45. Since the microscope is adapted to have its end portion 47 inserted in the drum over which the film passes during recording, it is necessary to provide a fixed relationship between the microscope and drum. This is accomplished by a pin 48 which is accommodated in a hole in the internal surface of the drum. A hole in the cylindrical wall of the drum serves to permit the light from the optical system to pass through to enter the aperture 30.

In the operation of the above described microscope, the top half of the objective 17 is covered by one prism, and the bottom half, by the other. When the microscope is rotated in the recording drum so that the prism 25 is directed midway between the image of slit 6 and the images of slits 7 and 8, the prisms 33 and 34 cause the images 6, 7, and 8 to appear to lie very near the effective microscope axis. This action is illustrated diagrammatically in Figure 4, where a representative ray 50 of a pencil from the slit 6 is shown approaching prism 33 from the prism 25, while a representative ray 51 of a pencil from either one or both of the slits 7 and 8 is shown approaching the prism 34 from the prism 25. These rays 50 and 51 are shown mutually parallel for convenience in drawing. The prisms 33 and 34 deflect the rays 50 and 51 respectively, so that they afterward diverge, and in consequence virtually have a common point of origin at a point P. In other words, light pencils from images of slits 6, 7, and 8 traveling from prisms 25 in the direction of the objective 17 diverge after passing through the prisms 33 and 34, and after such divergence proceed toward objective 17 from a projected point, P, of intersection on the axis of the objective. If the power of the prisms 33 and 34 is such that the point P lies in or close to the plane in which the slits 6, 7 and 8 effectively lie, then, in the telescope of which lens 17 is the objective, the slits 6, 7 and 8 will be seen to be substantially coincident, as shown in Fig. 5. Although a single 12-diopter prism could be mounted to cover only one-half of the objective lens 17, this would require that the microscope be directed toward either slit 6 or slits 7 and 8 rather than midway between them. The use of two 6-diopter prisms is preferred, because it is desirable to keep color dispersion arising in the prisms to a low value without employing color corrected prisms. The same effect could also have been obtained by mounting the prisms to meet in a plane that contains the axis and which is also substantially a principal section of each prism, while being, at the same time, effectively at right angles to the slits to be viewed. In such case, the refracting edges of the two prisms would be oppositely directed.

The principal section of a refracting prism is the section that is perpendicular to the refracting edge (thin edge) of the prism, or what amounts to the same thing, to the two refracting faces of the prism.

The construction of the modification of my invention in which prisms are cut in principal sections is illustrated by Figs. 7 and 8.

In Fig. 7, prism 33a is like prism 33, except that it is elongated parallel to the plane of the sketch and cut in half also parallel thereto, in order to cover the half of the lens, 17, that is toward the observer. In a similar manner prism 34a covers the half of lens, 17, that is away from the observer.

In Fig. 8, the planes ff and gg cut the prisms at right angles to the flat surfaces which transmit the light, or in other words these planes cut the prisms in principal sections. The planes ff and gg are in substantial coincidence, i. e., the prisms are arranged side by side or principal section to principal section, as illustrated by Fig. 8, and contain the microscope objective axis. The prisms must be separated enough to permit them to be rotated substantially on the axis of lens 17 to get the desired adjustments as described herein.

In Fig. 8, the ray 50 shown in Fig. 7, appears as a fan of rays which, after refraction by the prisms 33a appears to come from any point q on line PP. The same thing is true with respect to ray 51.

A point that is pertinent to the distinction between this arrangement of the prisms and the one illustrated by Fig. 4 is that it is immaterial whether the light that forms and is directed to each of the two displaced images comes through the top or bottom half of lens 17, or through the right or left half of the same lens. It is well understood in the art that the prisms must be located close to lens 17 in order to avoid vignetting, which might make an apparent material difference between the two arrangements in the case of elongated images of the kind discussed herein.

By the rotation of one of the prisms about the microscope axis, the corresponding slit image will move lengthwise of itself, and, since the purpose of the arrangement is to permit the observer to judge when given points on slit 6 are directly in vertical alignment with given points on slits 7 and 8, it is seen that a rotational adjustment of the prisms is desirable. The prisms may be correctly adjusted by viewing a straight line at right angles to the microscope tube axis and rotating the prisms until the two line images, which are seen when adjustment is imperfect, are observed to coincide. Thus, by the use of a focusing microscope of the above described type, the adjustment of the noise reduction shutter producing cutting edges 11 and 12, and the light modulating mirror producing the edges 10, may be quickly made prior to a recording or in intervals between recording sequences.

I claim:

1. A microscope to facilitate alignment of one or more points on the primary image of one elongated object with one or more points on the primary image of another elongated object, the said objects being separated from one another perpendicularly to the lengths thereof, comprising means for obtaining light from said objects to form secondary images, means for viewing said secondary images, and prisms having thin edges positioned intermediate said last mentioned means and said primary images for shifting the secondary images of said objects along a line perpendicular to said secondary images to positions closely adjacent one another, the said prisms having their thin edges substantially in a plane parallel with and including the optical axis of said viewing means, and means for permitting each of said prisms to be independently rotated about an axis perpendicular to its refracting edge and parallel to the optical axis of said viewing means to move said secondary images along the directions of their length, the angle through which each of said prisms deviates a ray of light coming from one of said objects being such that the tangent of this angle is substantially equal to one-half the distance between the primary images of the objects divided by the effective distance from the plane of the primary images of the objects to said prisms.

2. A microscope to facilitate the alignment of one or more points on the primary image of one elongated object with one or more points on the primary image of another elongated object, the said objects being separated from one another perpendicularly to the lengths thereof, comprising means for obtaining light from said objects to form secondary images, means for viewing said secondary images, prisms positioned intermediate said last mentioned means and said images for displacing said secondary images in closer relationship to each other, said prisms being separated along the optical axis of the microscope and having their thin edges oppositely directed, each of said prisms covering approximately one-half the aperture of the objective and being independently rotatable about an axis perpendicular to its refracting edge and parallel to the optical axis of said viewing means to move said secondary images in the directions of their lengths.

3. A microscope in accordance with claim 2, in which the angle through which each of said prisms deviates a ray of light coming from one of said objects is such that the tangent of such angle is substantially equal to one-half the effective distance between said primary images of said objects divided by the distance from the plane of said primary images to said prisms.

4. A microscope in accordance with claim 2, in which said prisms are cut in principal sections, the planes of said sections being in substantial coincidence and substantially containing the microscope objective axis, the said prisms being displaced along the microscope objective axis to permit of partial rotation of each of them.

5. A microscope in accordance with claim 2, in which the thin edges of said prisms are in substantial coincidence and substantially intersect the microscope objective axis.

6. A microscope in accordance with claim 2, in which said viewing means includes a right-angled prism and a spherical objective lens.

7. A microscope to facilitate alignment of one or more points on the image of a narrow elongated light passing aperture with one or more points on the image of another narrow elongated light passing aperture, comprising a housing, an objective lens and an eye-piece at the ends of said housing, a sleeve on which the end of said housing supporting said objective lens is mounted, a right-angle prism at the end of said sleeve, said prism receiving light through an opening in the side of said sleeve and reflecting said light to said objective lens, and a pair of prisms having thin edges oppositely disposed mounted in said sleeve intermediate said right-angle prism and said objective, each of said prisms covering approximately one-half of the aperture of said objective, the angle through which either prism deviates a ray of light coming from one of said elongated apertures being such that the tangent of said angle is substantially equal to one-half the effective distance between the images of said apertures divided by the distance from the plane of said images of said apertures to said prisms.

8. A microscope in accordance with claim 7, in which means are provided for rotatably adjusting said prisms, said prisms being in different planes and each having an edge cut along a principal section and said sections lying substantially in a common plane parallel with the optical axis of said objective lens.

9. A microscope to facilitate adjustment of the elements of a sound recording system in which vertically spaced slit apertures are employed, comprising a microscope objective lens; an internal reflecting prism; and two wedge prisms interposed between said lens and reflecting prism, one of said wedge prisms covering approximately one half of said lens and the other of said wedge prisms covering the other half thereof, the said wedge prisms having thin edges oppositely disposed from each other whereby rays of light passing through said apertures into said microscope will be deviated by said wedge prisms to cause the images of said slits to appear closer together than the slits actually are, said prisms being mounted for independent rotational adjustment whereby said adjustment of either of said wedge prisms will result in the shifting of a corresponding image in a direction longitudinal to itself.

LAWRENCE T. SACHTLEBEN.

REFERENCES CITED

The following references are of record in the file of this patent:

UNITED STATES PATENTS

| Number | Name | Date |
|---|---|---|
| 414,819 | Nordenfelt et al. | Nov. 12, 1889 |
| 624,106 | Satterlee | May 2, 1899 |
| 1,309,174 | Barr et al. | July 8, 1919 |
| 1,482,967 | Brierton | Feb. 5, 1924 |
| 1,541,315 | Ball et al. | June 9, 1925 |
| 1,564,418 | Konig | Dec. 8, 1925 |
| 1,680,534 | Garbutt et al. | Aug. 14, 1928 |
| 1,823,355 | Frappier et al. | Sept. 15, 1931 |
| 1,949,339 | Thomas | Feb. 27, 1934 |
| 2,139,222 | Collins | Dec. 6, 1938 |
| 2,371,999 | Isaacson | Mar. 20, 1945 |

FOREIGN PATENTS

| Number | Country | Date |
|---|---|---|
| 14,881 | Great Britain | of 1912 |
| 635,316 | Germany | Sept. 15, 1936 |